United States Patent
Prince et al.

(10) Patent No.: US 10,800,684 B2
(45) Date of Patent: Oct. 13, 2020

(54) ZINC AMMONIUM CARBONATE SULFIDE SCAVENGERS

(71) Applicant: MULTI-CHEM GROUP, LLC, Houston, TX (US)

(72) Inventors: Philippe Prince, Pearland, TX (US); Kiran Gawas, Humble, TX (US); Yulia Mosina, Kingwood, TX (US)

(73) Assignee: Multi-Chem Group, LLC, Houston, TX (US)

( * ) Notice: Subject to any disclaimer, the term of this patent is extended or adjusted under 35 U.S.C. 154(b) by 0 days.

(21) Appl. No.: 16/591,204

(22) Filed: Oct. 2, 2019

(65) Prior Publication Data

US 2020/0262724 A1 Aug. 20, 2020

Related U.S. Application Data

(60) Provisional application No. 62/807,187, filed on Feb. 18, 2019.

(51) Int. Cl.

| | | |
|---|---|---|
| *C02F 1/68* | (2006.01) | |
| *C10G 75/02* | (2006.01) | |
| *B01D 53/52* | (2006.01) | |
| *B01D 53/78* | (2006.01) | |
| *C02F 103/08* | (2006.01) | |
| *C02F 103/36* | (2006.01) | |
| *C02F 103/10* | (2006.01) | |
| *C02F 101/10* | (2006.01) | |

(52) U.S. Cl.
CPC ............ *C02F 1/683* (2013.01); *B01D 53/52* (2013.01); *B01D 53/78* (2013.01); *C10G 75/02* (2013.01); *B01D 2251/606* (2013.01); *C02F 2101/101* (2013.01); *C02F 2101/40* (2013.01); *C02F 2103/08* (2013.01); *C02F 2103/10* (2013.01); *C02F 2103/365* (2013.01)

(58) Field of Classification Search
CPC .... B01D 15/00; B01D 53/1468; B01D 53/52; B01D 53/526; B01D 53/8612; B01D 53/8618; B01D 2215/00; B01D 2251/606; B01D 2252/10; B01D 2253/112; B01D 2253/1122; B01D 2255/20792; B01D 2257/304; B01J 19/00; B01J 20/0244; B01J 23/06; B01J 2219/00; B01J 2523/27; C02F 1/281; C02F 1/5236; C02F 2101/101; C10K 1/004; C10L 3/103; C10G 29/00

See application file for complete search history.

(56) References Cited

U.S. PATENT DOCUMENTS

| | | | |
|---|---|---|---|
| 3,928,211 A | | 12/1975 | Browning et al. |
| 4,147,212 A | * | 4/1979 | Tisdale .............. E21B 21/068 166/244.1 |
| 4,941,991 A | * | 7/1990 | Rajamannan .......... A61L 9/01 252/183.11 |
| 6,703,341 B2 | | 3/2004 | Scranton, Jr. |
| 6,887,445 B2 | | 5/2005 | Braga et al. |
| 9,480,946 B2 | | 11/2016 | Ramachandran et al. |
| 9,988,580 B2 | | 6/2018 | Randal |
| 2003/0152508 A1 | * | 8/2003 | Nip ...................... C01G 9/00 423/419.1 |
| 2018/0100096 A1 | | 4/2018 | Wylde |

OTHER PUBLICATIONS

Chandar et al.: "Absorption of hydrogen sulfide in ammonical solution of zinc chloride." AIChE 35(9), pp. 1547-1550.

* cited by examiner

*Primary Examiner* — Timothy C Vanoy
(74) *Attorney, Agent, or Firm* — Tenley Krueger; Baker Botts L.L.P.

(57) ABSTRACT

Methods for the use of zinc ammonium carbonate as a scavenger of sulfur-containing species encountered in oilfield operations are provided. In one embodiment, the methods include introducing a sulfide scavenging additive including zinc ammonium carbonate into at least a portion of a conduit through which a potential sulfur-containing fluid is flowing.

17 Claims, 5 Drawing Sheets

US 10,800,684 B2

ZINC AMMONIUM CARBONATE SULFIDE SCAVENGERS

CROSS-REFERENCE TO RELATED APPLICATION

The present application claims the benefit of U.S. Provisional Application No. 62/807,187 filed Feb. 18, 2019, which is incorporated herein by reference in its entirety for all purposes.

BACKGROUND

The present disclosure relates to methods for treating fluids used in the production and/or transport of petroleum products and natural gas, and to methods for the removal of sulfur-containing species encountered in fluids used and encountered in such operations.

Hydrogen sulfide ($H_2S$) is a corrosive gas commonly found in oil and gas production operations. For example, fluids in sewage systems, fluids produced from wells, and make-up fluids frequently contain hydrogen sulfide. Hydrogen sulfide can be highly corrosive to pipelines and equipment used in the production and transportation of oil and gas, and may damage tubing, casings, surface facilities, or other types of wellbore equipment. Hydrogen sulfide may also cause sulfide scaling, which may restrict flow and form undesirable deposits in the surface facilities.

To control the release of hydrogen sulfide gas, scavengers may be used to react with sulfides and form products that are nonhazardous and noncorrosive. Certain sulfide scavengers may be limited by their reaction rates. This may be particularly problematic in low-contact time applications, or under cold weather conditions that slow reaction rates. In some cases, very high scavenger dose rates may be used in these situations to obtain the desired scavenging effect. However, it may be impractical or prohibited to use certain sulfide scavengers in large quantities in certain locations.

BRIEF DESCRIPTION OF THE DRAWINGS

These drawings illustrate certain aspects of some of the embodiments of the present disclosure and should not be used to limit or define the claims.

Figure 1:
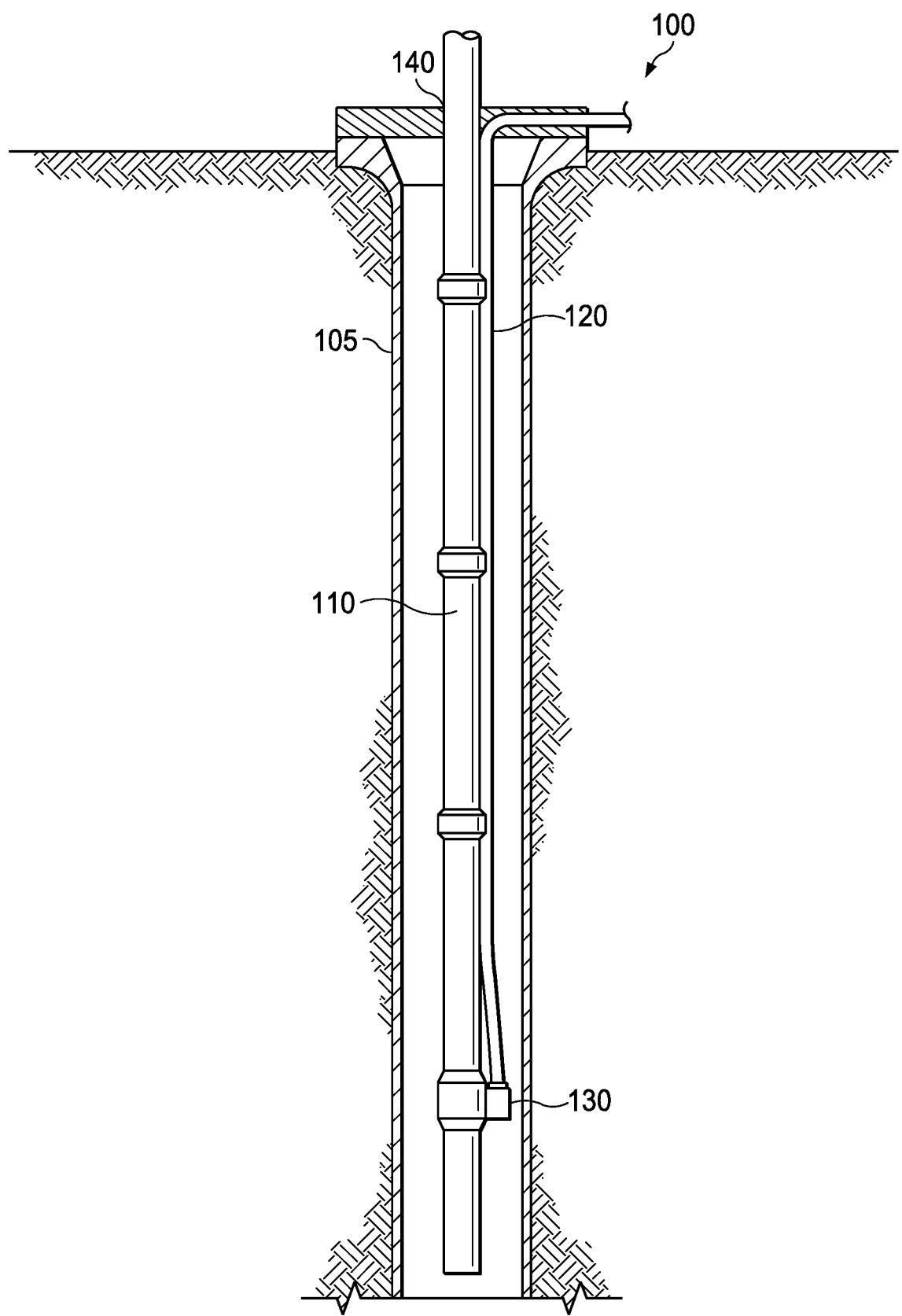
FIG. 1 is a schematic diagram of an injection system used in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods for treating fluids used in the production and/or transport of petroleum products and natural gas, and to methods for the removal of sulfur-containing species encountered in fluids used and encountered in such operations.

More specifically, the present disclosure provides methods for introducing a sulfide scavenging additive that includes zinc ammonium carbonate into a location (e.g., at least a portion of a subterranean formation) where one or more sulfur-containing species are present. In some embodiments, the zinc ammonium carbonate additive may be introduced into a portion of a conduit (e.g., a pipeline) or container wherein one or more sulfur-containing species are present. In certain embodiments, the zinc ammonium carbonate additive may be introduced into a fluid retention pit (e.g. a mud pit).

Among the many advantages to the methods of the present disclosure, only some of which are alluded to herein, the additives and methods of the present disclosure may, among other benefits, provide for faster, safer, less corrosive, less toxic and/or more efficient removal of sulfur-containing species from a fluid (e.g., a fluid located in a conduit, container, fluid retention pit, or subterranean formation). In certain embodiments, the sulfide scavenging additives of the present disclosure may provide an enhanced ability to scavenge sulfur-containing species as compared to certain other sulfide scavengers, at least in part due to the increased rate at which zinc ammonium carbonate reacts with sulfur-containing species. In some embodiments, the sulfide scavenging additives of the present disclosure may provide more effective sulfide scavenging even at low contact times and over a wide variety of temperatures as compared to certain other sulfide scavengers. In certain embodiments, the sulfide scavenging additives of the present disclosure may provide an enhanced ability to scavenge sulfur-containing species in oilfield operations where a high concentration of carbon dioxide is present. In certain embodiments, the rapid reaction with sulfur-containing species of the sulfide scavenging additive of the present disclosure may provide for lower dosage rates, even in situations requiring a limited contact time between the additive and the fluid. In certain embodiments, this may avoid the overtreatment of fluids, reduce the cost of chemicals, reduce operating costs, and minimize the impact of high pH scavengers such as triazines.

In certain embodiments, the zinc ammonium carbonate sulfide scavenging additive may react with the sulfur-containing species to eliminate or reduce the concentration of sulfur-containing species. In some embodiments, the zinc ammonium carbonate sulfide scavenging additive may react with the sulfur-containing species at a faster reaction rate as compared to certain other sulfide scavengers after being introduced into and/or in contact with the sulfur-containing species. In certain embodiments, the zinc ammonium carbonate sulfide scavenging additive may react with the sulfur-containing species at a faster reaction rate as compared to certain other sulfide scavengers, even at low temperatures (e.g., one or more of the temperature ranges referenced below). In certain embodiments, this may allow the zinc ammonium carbonate sulfide scavenging additive of the present disclosure to react with sulfur-containing species at reduced contact times and over a wider variety of temperatures compared to certain existing sulfide scavengers. The zinc ammonium carbonate sulfide scavenging additive of the present disclosure may be used in a variety of applications and environments in which sulfur-containing species are present or are expected to be present based on, for example, prior operations and/or other direct or indirect information. Such environments are referred to herein as "potential sulfur-containing environments". Fluids in potential sulfur-containing environments that include or are expected to include a sulfur-containing species are referred to herein as "potential sulfur-containing fluids". Examples of applications suitable for certain embodiments of the present disclosure may include, but are not limited to use in conduits, containers, fluid retention pits, subterranean formations, other portions of refining applications, gas separation towers/applications, transportation pipelines, pipeline treatments, water disposal and/or treatments, and sewage disposal and/or treatments, and/or downhole applications (e.g., drilling, fracturing, completions, oil production).

In certain embodiments, the zinc ammonium carbonate sulfide scavenging additive may be applicable to injection wells, monitoring wells, and/or production wells, including hydrocarbon or geothermal wells and wellbores.

In certain embodiments, the zinc ammonium carbonate sulfide scavenging additive may be introduced into at least a portion of a conduit, container, fluid retention pit, subterranean formation, or other location, wherein one or more sulfur-containing species are or may be present. In some embodiments, once introduced into a conduit, container, fluid retention pit, subterranean formation, or other location, the zinc ammonium carbonate sulfide scavenging additive may remove one or more sulfur-containing species, or inhibit, retard, reduce, control, and/or delay the formation of one or more sulfur-containing species, within the conduit, container, fluid retention pit, subterranean formation, or other location. In certain embodiments, the zinc ammonium carbonate sulfide scavenging additive may react with the sulfur-containing species to form nonhazardous and/or non-corrosive products. In some embodiments, the zinc ammonium carbonate sulfide scavenging additive may be introduced into and/or contact a fluid to be treated. The fluid to be treated may be flowing through, or may be substantially stationary in, the conduit, container, fluid retention pit, subterranean formation, or other location.

In certain embodiments, the zinc ammonium carbonate sulfide scavenging additive may be in contact with the sulfur-containing species or a fluid containing such species for a contact time of from about 0.1 seconds to about 5 seconds. In other embodiments, the zinc ammonium carbonate sulfide scavenging additive may be in contact with the sulfur-containing species or a fluid containing such species for a contact time of from about 1 second to about 5 seconds. In some embodiments, the zinc ammonium carbonate sulfide scavenging additive may be in contact with the sulfur-containing species or a fluid containing such species for a contact time of from about 0.1 seconds to about 20 seconds. In other embodiments, the zinc ammonium carbonate sulfide scavenging additive may be in contact with the sulfur-containing species or a fluid containing such species for a contact time of from about 1 second to about 20 seconds. In some embodiments, short contact times between the zinc ammonium carbonate sulfide scavenging additive and the sulfur-containing species may be caused, for example, by short portions of conduit or pipeline. The zinc ammonium carbonate sulfide scavenging additive of the present disclosure may provide an enhanced ability to scavenge sulfur-containing species as compared to other sulfide scavengers due to a higher and/or faster reactivity with sulfur-containing species at low temperatures. In some embodiments, the zinc ammonium carbonate sulfide scavenging additive may be introduced into a fluid that contains or is expected to contain one or more sulfur-containing species when the temperature of the fluid or the environment in which the fluid flows or resides is in the range of from about −20° C. (−4° F.) to about 50° C. (122° F.). In certain embodiments, the zinc ammonium carbonate sulfide scavenging additive may be introduced into a fluid that contains or is expected to contain one or more sulfur-containing species wherein the temperature of fluid or the environment in which the fluid flows or resides is as low as any of −20, −19, −18, −17, −16, −15, −14, −13, −12, −11, −10, −9, −8, −7, −6, −5, −4, −3, −2, −1, and 0° C. In certain embodiments, the zinc ammonium carbonate sulfide scavenging additive may be introduced into a fluid that contains or is expected to contain one or more sulfur-containing species, wherein the temperature of the fluid or the environment in which the fluid flows or resides is as high as any of 0, 5, 10, 15, 20, 25, 30, 35, 40, 45 and 50° C. In certain embodiments, the zinc ammonium carbonate sulfide scavenging additive may be introduced into a fluid that contains or is expected to contain one or more sulfur-containing species wherein the temperature of the fluid or the environment in which the fluid flows or resides is in the range of from about −20° C. (−4° F.) to about 50° C. (122° F.), in other embodiments, about −20° C. (−4° F.) to about 25° C. (77° F.), in other embodiments, about −20° C. (−4° F.) to about 10° C. (50° F.), in other embodiments, about −20° C. (−4° F.) to about 5° C. (41° F.), in other embodiments, about −20° C. (−4° F.) to about 0° C. (32° F.), in other embodiments, about −10° C. (14° F.) to about 5° C. (41° F.), in other embodiments, about −10° C. (14° F.) to about 0° C. (32° F.), in other embodiments, about −5° C. (23° F.) to about 5° C. (41° F.), in other embodiments, about −5° C. (23° F.) to about 0° C. (32° F.).

In certain embodiments, the zinc ammonium carbonate sulfide scavenging additive may include a solution including zinc ammonium carbonate. In some embodiments, the solution may further include one or more glycols (e.g., ethylene glycol or polyethylene glycol). This may allow the zinc ammonium carbonate to function as a sulfide scavenger in cold weather conditions, e.g., when the outside temperature falls below 0° C. (32° F.). Low temperature applications of the zinc ammonium carbonate sulfide scavenging additive of the present disclosure may include scavenging sulfur-containing species in pipelines, conduits, other fluid transportation lines, containers, fluid retention pits, subterranean formations, or any combination thereof, in winter and/or other cold weather conditions.

The zinc ammonium carbonate sulfide scavenging additive of the present disclosure may provide an enhanced ability to scavenge sulfur-containing species as compared to other sulfide scavengers at high concentrations of carbon dioxide ($CO_2$). For example, the zinc ammonium carbonate sulfide scavenging additive may provide effective sulfide scavenging at concentrations of carbon dioxide from about 0.01% to about 10% by volume of gas of a gas phase of a fluid. In other embodiments, the zinc ammonium carbonate sulfide scavenging additive may provide effective sulfide scavenging at concentrations of carbon dioxide from about 0.01% to about 40% by volume of gas of a gas phase of a fluid. In certain embodiments, the zinc ammonium carbonate sulfide scavenging additive may provide effective sulfide scavenging at concentrations of carbon dioxide as high as any of 15, 20, 25, 30, 35, and 40% by volume of gas of a gas phase of a fluid. In some embodiments, the carbon dioxide may be present as a gas. In other embodiments, the carbon dioxide may be dissolved in a liquid phase. In certain embodiments, the fluid may include a gas phase and a liquid phase and the carbon dioxide may be present in both the gas phase and in the liquid phase.

In certain embodiments, the zinc ammonium carbonate sulfide scavenging additive may provide effective sulfide scavenging at concentrations of carbon dioxide from about 10 to about 1000 ppm by concentration dissolved in a liquid phase of a fluid. In other embodiments, the zinc ammonium carbonate sulfide scavenging additive may provide effective sulfide scavenging at concentrations of carbon dioxide from about 1 to about 1500 ppm by concentration dissolved in a liquid phase of a fluid. In certain embodiments, the zinc ammonium carbonate sulfide scavenging additive may provide effective sulfide scavenging at concentrations of carbon dioxide as high as any of 250, 500, 750, 1000, 1250 and 1500 ppm by concentration dissolved in a liquid phase of a fluid.

The sulfur-containing species of the present disclosure may include any compounds or chemical species that include one or more sulfur atoms or ions, including but not limited to hydrogen sulfide, sulfide ions, mercaptans, polysulfides, or any combination thereof. A mercaptan may include any sulfur-containing compound of the general formula R—SH, such as ethyl mercaptan or ethanethiol. Polysulfides may include a class of sulfur species with alternating chains of sulfur atoms and hydrocarbons. In certain embodiments, the zinc ammonium carbonate sulfide scavenging additive may be added to a fluid including the sulfur-containing species at a stoichiometric ratio of from about 1:10 to 5:1, wherein the stoichiometric ratio is the molar ratio of scavenging additive to sulfur-containing species (either the known or expected molar concentration of those species). In some embodiments, the zinc ammonium carbonate sulfide scavenging additive may be added to a fluid that contains or is expected to contain the sulfur-containing species at a stoichiometric ratio as low as any of 1:10, 1:9, 1:8, 1:7, 1:6, 1:5, 1:4, 1:2, 1:2 and 1:1, wherein the stoichiometric ratio is the molar ratio of scavenging additive to sulfur-containing species. In some embodiments, the zinc ammonium carbonate sulfide scavenging additive may be added to a fluid that contains or is expected to contain the sulfur-containing species at a stoichiometric ratio as high as any of 1:1, 3:2, 2:1, 5:2, 3:1, 7:2, 4:1, 9:2 and 5:1, wherein the stoichiometric ratio is the molar ratio of scavenging additive to sulfur-containing species. In certain embodiments, the zinc ammonium carbonate sulfide scavenging additive may be added to a fluid that contains or is expected to contain the sulfur-containing species at a stoichiometric ratio of from about 1:8 to about 5:1, in other embodiments, about 1:5 to about 3:1, in other embodiments, about 1:2 to about 2:1, in other embodiments, about 1:1 to about 3:2, wherein the stoichiometric ratio is the molar ratio of scavenging additive to sulfur-containing species.

In certain embodiments, a zinc ammonium carbonate sulfide scavenging additive may react with a sulfur-containing species present in a conduit, container, fluid retention pit, or subterranean formation to remove the species. The zinc ammonium carbonate sulfide scavenging additive may be provided as a zinc ammonium carbonate solution that may include zinc ammonium carbonate and a solvent. The solvent may include water, one or more glycols (e.g., ethylene glycol or polyethylene glycol), a water-glycol mixture, an alcohol, or any combination thereof. The one or more glycols may serve as an antifreeze in cold weather conditions. The zinc ammonium carbonate solution may be added to a fluid by any means known in the art.

In certain embodiments, zinc ammonium carbonate may be present in the zinc ammonium carbonate sulfide scavenging additive in an amount of from about 0.1% to about 26% by weight of the additive solution. In some embodiments, zinc ammonium carbonate may be present in the zinc ammonium carbonate sulfide scavenging additive in an amount as low as any of: 0.1, 0.50, 1.00, 1.5, 2.00, 2.50, 3.00, 3.50, 4.00, 4.50, 5.00, 5.50, and 6.00% by weight of the additive solution. In some embodiments, zinc ammonium carbonate may be present in the zinc ammonium carbonate sulfide scavenging additive in an amount as high as any of: 1.0, 2.0, 3.0, 4.0, 5.0, 6.0, 7.0, 8.0, 9.0, 10.0, 11.0, 12.0, 13.0, 14.0, 15.0, 16.0, 17.0, 18.0, 19.0, 20.0, 21.0, 22.0, 23.0, 24.0 and 25.0% by weight of the additive solution. In certain embodiments, zinc ammonium carbonate may be present in the zinc ammonium carbonate sulfide scavenging additive in an amount from about 0.1% to about 14% by weight of the additive solution, in other embodiments, about 0.1% to about 8% by weight of the additive solution, in other embodiments, about 0.5% to about 6% by weight of the additive solution, in other embodiments, about 1.0% to about 5% by weight of the additive solution.

In certain embodiments, the amount of glycol present in a zinc ammonium carbonate additive solution may be from about 0.1% to about 25% by volume of the additive solution. In some embodiments, the amount of glycol present in a zinc ammonium carbonate additive solution may be as low as any of: 0.1, 0.50, 1.00, 1.5, 2.00, 2.50, 3.00, 3.50, 4.00, 4.50, and 5.00% by volume of the additive solution. In some embodiments, the amount of glycol present in a zinc ammonium carbonate additive solution may be as high as any of: 1.0, 2.0, 3.0, 4.0, 5.0, 6.0, 7.0, 8.0, 9.0, 10.0, 11.0, 12.0, 13.0, 14.0, 15.0, 16.0, 17.0, 18.0, 19.0, 20.0, 21.0, 22.0, 23.0, 24.0, and 25.0% by volume of the additive solution. In certain embodiments, the amount of glycol present in a zinc ammonium carbonate additive solution may be from about 0.1% to about 15% by volume of the additive solution, in other embodiments, about 0.1% to about 10% by volume of the additive solution, in other embodiments, about 0.5% to about 5% by volume of the additive solution, in other embodiments, about 1.0% to about 4% by volume of the additive solution.

In certain embodiments, a zinc ammonium carbonate sulfide scavenging additive may be introduced into and/or contact a fluid that may include any one or more of an aqueous fluid, a gas, a liquid hydrocarbon, an oil-water mixed production fluid, and any combination thereof. In some embodiments, the aqueous fluid may include water, salt water (e.g., water containing one or more salts dissolved therein), brine (e.g., saturated salt water), seawater, or any combination thereof. Although listed separately from liquid hydrocarbon, the gas may include gaseous hydrocarbon, though the gas need not necessarily include hydrocarbon. In some embodiments, the gas may include, but is not limited to oxygen ($O_2$), hydrogen ($H_2$), nitrogen ($N_2$), carbon dioxide, methane ($CH_4$), hydrogen sulfide, argon (Ar), krypton (Kr), xenon (Xe), a hydrocarbon, a freon, and any combination thereof. In certain embodiments, the zinc ammonium carbonate sulfide scavenging additive may be introduced into and/or contact the fluid to be treated through a conduit or an injection point. In certain embodiments, the zinc ammonium carbonate sulfide scavenging additive of the present disclosure may be introduced into a conduit, container, fluid retention pit, subterranean formation, wellhead, wellbore, and the like and may be introduced into and/or contact a fluid residing therein. In certain embodiments, the fluid to be treated may be flowing or it may be substantially stationary.

In certain embodiments, a zinc ammonium carbonate sulfide scavenging additive may be added to a fluid before the fluid contains any detectable amount of sulfur-containing species, for example, in a fluid retention pit before the fluid has circulated. This may be, for example, a prophylactic measure against sulfur-containing species that the fluid may encounter downhole. In certain embodiments, a zinc ammonium carbonate sulfide scavenging additive may be added to a fluid in a fluid retention pit after the fluid has circulated. In certain embodiments, a zinc ammonium carbonate sulfide scavenging additive may be added after the fluid to be treated has been circulating downhole and has already encountered sulfur-containing species and contains the same. In some embodiments, a zinc ammonium carbonate sulfide scavenging additive may be injected directly into a production flowline below a wellhead (e.g., via an injection quill), where it may be used to remove sulfur-containing species from mixed oil-water production fluids.

In certain embodiments, the amount of a zinc ammonium carbonate sulfide scavenging additive added to a fluid may be controlled and/or varied during the course of an operation based on, among other things, the amount of sulfur-containing species detected in a fluid exiting the wellbore. In these embodiments, any system or technique capable of monitoring or detecting the presence or amount of sulfur-containing species in fluids exiting a wellbore may be used. Moreover, a zinc ammonium carbonate sulfide scavenging additive may be added to a fluid to be treated in batches added at separate intervals spaced over a period of time. For example, a first amount of zinc ammonium carbonate sulfide scavenging additive may be added to a fluid to be treated at one point in time during the course of a particular operation. At a subsequent point during that operation, a second amount (e.g., a higher amount) of sulfur-containing species may be detected exiting the wellbore. At this point, a second amount of zinc ammonium carbonate sulfide scavenging additive may be added to the fluid to be treated based, at least in part, on the amount of sulfur-containing species detected.

In the methods of the present disclosure, the zinc ammonium carbonate sulfide scavenging additive may be added to, or included in, a treatment fluid in any amount that may effectively eliminate or reduce the concentration of sulfur-containing species that are present (e.g., as detected in fluids in a conduit or exiting a wellbore), or are expected to be present, by the desired amount in a fluid to be treated. The zinc ammonium carbonate sulfide scavenging additive may be added to, or included in, the treatment fluid as a zinc ammonium carbonate solution. In certain embodiments, an initial amount of zinc ammonium carbonate sulfide scavenging additive may be added to a treatment fluid followed by subsequent, additional amounts. This technique may be used to increase and/or maintain a concentration of zinc ammonium carbonate sulfide scavenging additive that may be sufficient to remove the desired amount of sulfur-containing species in a fluid to be treated throughout the course of a given operation.

Treatment fluids can be used in a variety of above ground and subterranean treatment operations. As used herein, the terms "treat," "treatment," "treating," and grammatical equivalents thereof refer to any above ground or subterranean operation that uses a fluid in conjunction with achieving a desired function and/or for a desired purpose. Use of these terms does not imply any particular action by the treatment fluid. Illustrative treatment operations can include, for example, surface facilities operations, fracturing operations, gravel packing operations, acidizing operations, scale dissolution and removal, consolidation operations, and the like.

The treatment fluid of the present disclosure may include any carrier fluid known in the art, including an aqueous fluid, a non-aqueous fluid, or any combination thereof. An aqueous fluid that may be suitable for use as a carrier fluid may include water from any source. This may include fresh water, salt water (e.g., water containing one or more salts dissolved therein), brine (e.g., saturated salt water), seawater, or any combination thereof. The aqueous fluid may be from a source that does not contain compounds that adversely affect other components of a fluid. In certain embodiments of the present disclosure, an aqueous fluid may include one or more ionic species, such as those formed by salts dissolved in water. For example, seawater and/or produced water may include a variety of divalent cationic species dissolved therein. In certain embodiments, the density of the aqueous fluid can be adjusted, among other purposes, to provide additional particulate transport and suspension in the treatment fluids of the present disclosure. In certain embodiments, the pH of the aqueous fluid may be adjusted (e.g., by a buffer or other pH adjusting agent) to a specific level, which may depend on, among other factors, the types of viscosifying agents, acids, and other additional additives included in a fluid. One of ordinary skill in the art, with the benefit of this disclosure, will recognize when such density and/or pH adjustments are appropriate. Examples of a non-aqueous fluid that may be suitable for use as a carrier fluid include, but are not limited to an oil, a hydrocarbon, an organic liquid, a mineral oil, a synthetic oil, an ester, or any combination thereof.

In certain embodiments, a treatment fluid of the present disclosure optionally may include any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional sulfide scavengers, carbon dioxide scavengers, oxygen scavengers, lubricants, viscosifiers, breakers, weighting agents, relative permeability modifiers, resins, wetting agents, coating enhancement agents, filter cake removal agents, antifreeze agents (e.g., ethylene glycol or polyethylene glycol), or any combination thereof. A person skilled in the art, with the benefit of this disclosure, will recognize the types of additional additives that may be included in the fluids of the present disclosure for a particular application.

In certain embodiments, a surfactant may be used together with the zinc ammonium carbonate sulfide scavenging additive. The surfactant may, among other purposes, help disperse the zinc ammonium carbonate sulfide scavenging additive and/or other additives in a fluid. A suitable surfactant may include an alkoxylated alkyl alcohol and salts thereof, an alkoxylated alkyl phenol and salts thereof, an alkyl or aryl sulfonate, a sulfate, a phosphate, a carboxylate, a polyoxyalkyl glycol, a fatty alcohol, a polyoxyethylene glycol sorbitan alkyl ester, a sorbitan alkyl ester, a polysorbate, a glucoside, a quaternary amine compound, an amine oxide surfactant, or any combination thereof.

In certain embodiments of the present disclosure, the zinc ammonium carbonate sulfide scavenging additive, treatment fluids, and/or additional additives of the present disclosure may be introduced into a conduit, container, mud pit, subterranean formation, and/or wellbore penetrating a subterranean formation using any method or equipment known in the art. Introduction of the zinc ammonium carbonate sulfide scavenging additive, treatment fluids, and/or additional additives of the present disclosure may include delivery via any of a tube, umbilical, pump, gravity, and combinations thereof. The zinc ammonium carbonate sulfide scavenging additive, treatment fluids, and/or additional additives of the present disclosure may, in various embodiments, be delivered into top-side flowlines, pipelines, surface treating equipment, or downhole (e.g., into the wellbore).

For example, in certain embodiments, the zinc ammonium carbonate sulfide scavenging additive, treatment fluids, and/or additional additives of the present disclosure may be applied to a subterranean formation and/or wellbore using batch treatments, squeeze treatments, continuous treatments, and/or combinations thereof. In certain embodiments, a batch treatment may be performed in a subterranean formation by stopping production from the well and pumping a certain amount of the zinc ammonium carbonate sulfide scavenging additive, treatment fluids, and/or additional additives into a wellbore, which may be performed at one or more points in time during the life of a well. In other embodiments, a squeeze treatment may be performed by dissolving the zinc ammonium carbonate sulfide scavenging additive, treatment fluids, and/or additional additives in a suitable solvent at a suitable concentration and squeezing that solvent carrying the scavenging additive or additional additives downhole into the formation, allowing production out of the formation to bring the scavenging additive or additional additives to the desired location. In certain embodiments, the sulfur-containing species may be present in a gaseous phase and the zinc ammonium carbonate sulfide scavenging additives may be injected as a mist. In other embodiments, the sulfur containing species may be present in a gaseous phase and the zinc ammonium carbonate sulfide scavenging additive may be injected as a liquid, such that the gaseous phase bubbles through the additives in a tower.

In certain embodiments, the zinc ammonium carbonate sulfide scavenging additive of the present disclosure may be added to a conduit where one or more fluids enter the conduit at one or more other locations along the length of the conduit. In these embodiments, the zinc ammonium carbonate sulfide scavenging additive may be added in batches or injected substantially continuously while the conduit is being used, for example, to maintain the concentration of the zinc ammonium carbonate sulfide scavenging additive of the present disclosure in the fluid at a certain amount (e.g., one or more of the amounts referenced above).

In some embodiments, the present disclosure provides methods for using the zinc ammonium carbonate sulfide scavenging additive, treatment fluids, and/or additional additives to carry out a variety of subterranean treatments, including but not limited to, preflush treatments, afterflush treatments, hydraulic fracturing treatments, acidizing treatments, sand control treatments (e.g., gravel packing), "frac-pack" treatments, wellbore clean-out treatments, drilling operations, and other operations where a treatment fluid may be useful. Such treatment fluids may include, but are not limited to, drilling fluids, preflush fluids, afterflush fluids, fracturing fluids, acidizing fluids, gravel packing fluids, packer fluids, spacer fluids, and the like. In certain embodiments, the methods of the present disclosure may be used to reduce or eliminate concentrations of hydrogen sulfide released to the atmosphere by adding the treatment fluids to fluid retention pits and settling ponds on location proximate the well.

In some embodiments, the zinc ammonium carbonate sulfide scavenging additive, treatment fluids, and/or additional additives may be used in treating a portion of a subterranean formation, for example, in acidizing treatments such as matrix acidizing or fracture acidizing. In certain embodiments, a treatment fluid including the zinc ammonium carbonate sulfide scavenging additive may be introduced into a subterranean formation. In some embodiments, the treatment fluid including the zinc ammonium carbonate sulfide scavenging additive may be introduced into a wellbore that penetrates a subterranean formation. In some embodiments, the treatment fluid including the zinc ammonium carbonate sulfide scavenging additive may be introduced at a pressure sufficient to create or enhance one or more fractures within the subterranean formation (e.g., hydraulic fracturing).

In still other embodiments, the zinc ammonium carbonate sulfide scavenging additive, treatment fluids, and/or additional additives of the present disclosure may be injected into a portion of a conduit, container, mud pit, or subterranean formation using an annular space or capillary injection system to continuously introduce the zinc ammonium carbonate sulfide scavenging additive, treatment fluids, and/or additional additives. Other means and/or equipment that may be used to continuously inject the zinc ammonium carbonate sulfide scavenging additive, treatment fluids, and/or additional additives of the present disclosure into a wellbore include, but are not limited to slip-stream systems, annulus drip systems, cap strings, umbilical strings, gas lift systems, continuous metering systems, subsurface hydraulic systems, bypass feeders, and the like.

In certain embodiments, such continuous injection equipment at a well site may be controlled from a remote location and/or may be partially or completely automated. In certain embodiments, a treatment fluid including the zinc ammonium carbonate sulfide scavenging additive of the present disclosure may be circulated in the wellbore using the same types of pumping systems and equipment at the surface that are used to introduce treatment fluids or additives into a wellbore penetrating at least a portion of the subterranean formation.

For example, the zinc ammonium carbonate sulfide scavenging additive of the present disclosure may be introduced into a wellbore and/or tubing using a capillary injection system as shown in FIG. 1. Referring now to FIG. 1, wellbore 105 may be drilled to penetrate a portion of subterranean formation 100. Tubing 110 (e.g., production tubing) may be placed in wellbore 105. Capillary injection tube 120 may be disposed in the annular space between the outer surface of tubing 110 and the inner wall of wellbore 105. Capillary injection tube 120 may be connected to side-pocket mandrel 130 at a lower section of tubing 110. The zinc ammonium carbonate sulfide scavenging additive of the present disclosure may be injected into capillary injection tube 120 at wellhead 140 (e.g., using one or more pumps (not shown)) at the surface such that it mixes with production fluid at or near side-pocket mandrel 130. The system shown in FIG. 1 may also include one or more valves (not shown) at one or more locations along capillary injection tube 120, among other reasons, to prevent flowback of fluid or gas to the surface through the tube. As production fluid flows through tubing 110, the zinc ammonium carbonate sulfide scavenging additive may remove one or more sulfur-containing species, or inhibit, retard, reduce, control, and/or delay the formation of one or more sulfur-containing species, within the tubing 110. Other capillary injection systems and side pocket mandrel devices (e.g., those used in gas lift production) may be used in a similar manner to the system shown in FIG. 1.

While not specifically illustrated herein, the disclosed fluids and additives may also directly or indirectly affect any transport or delivery equipment used to convey the fluids and additives to the subterranean formation 100, a conduit, container, or fluid retention pit, such as, for example, any transport containers, conduits, pipelines, trucks, tubulars, and/or pipes used to fluidically move the fluids and additives from one location to another, any pumps, compressors, or motors used to drive the fluids and additives into motion, any valves or related joints used to regulate the pressure or flow rate of the fluids and additives, and any sensors (i.e., pressure and temperature), gauges, and/or combinations thereof, and the like.

An embodiment of the present disclosure is a method including introducing a sulfide scavenging additive including zinc ammonium carbonate into at least a portion of a conduit through which a potential sulfur-containing fluid is flowing.

Another embodiment of the present disclosure is a method including introducing a sulfide scavenging additive including zinc ammonium carbonate into a container in which a potential sulfur-containing fluid is present.

Another embodiment of the present disclosure is a method including introducing a sulfide scavenging additive including zinc ammonium carbonate into a fluid retention pit in which a potential sulfur-containing fluid is present and wherein the temperature of an environment in which the fluid is present may be in the range of from about −20° C. to about 0° C.

Another embodiment of the present disclosure is a method including introducing a sulfide scavenging additive including zinc ammonium carbonate into at least a portion of a conduit through which a potential sulfur-containing fluid is flowing, wherein the sulfide scavenging additive may include a solution including zinc ammonium carbonate in an amount of from about 0.1% to about 26% by weight of the solution. Optionally in this embodiment or any other embodiment disclosed herein, the sulfide scavenging additive may be in contact with the fluid for a contact time of from about 0.1 seconds to about 20 seconds. Optionally in this embodiment or any other embodiment of the present disclosure, the temperature of an environment in which the fluid is flowing may be in the range of from about −20° C. to about 0° C. Optionally in this embodiment or any other embodiment of the present disclosure, the fluid may include a gas phase and the gas phase may include carbon dioxide in an amount of from about 0.01% to about 20% by volume of gas. Optionally in this embodiment or any other embodiment of the present disclosure, the sulfide scavenging additive may further include one or more glycols. Optionally in this embodiment or any other embodiment of the present disclosure, the fluid may include at least one component selected from the group consisting of: water, salt water, brine, seawater, a gas, a liquid hydrocarbon, an oil-water mixed production fluid, and any combination thereof. Optionally in this embodiment or any other embodiment of the present disclosure, the fluid may further include a sulfur-containing species that may be selected from the group consisting of: hydrogen sulfide, a sulfide ion, a mercaptan, a polysulfide, and any combination thereof.

Another embodiment of the present disclosure is a method including introducing a sulfide scavenging additive including zinc ammonium carbonate into a container in which a potential sulfur-containing fluid is present, wherein the sulfide scavenging additive may include a solution including zinc ammonium carbonate in an amount of from about 0.1% to about 26% by weight of the solution. Optionally in this embodiment or any other embodiment disclosed herein, the sulfide scavenging additive may be in contact with the fluid for a contact time of from about 0.1 seconds to about 20 seconds. Optionally in this embodiment or any other embodiment of the present disclosure, the temperature of an environment in which the fluid is present may be in the range of from about −20° C. to about 0° C. Optionally in this embodiment or any other embodiment of the present disclosure, the fluid may include a gas phase and the gas phase may include carbon dioxide in an amount of from about 0.01% to about 20% by volume of gas. Optionally in this embodiment or any other embodiment of the present disclosure, the sulfide scavenging additive may further include one or more glycols. Optionally in this embodiment or any other embodiment of the present disclosure, the fluid may include at least one component selected from the group consisting of: water, salt water, brine, seawater, a gas, a liquid hydrocarbon, an oil-water mixed production fluid, and any combination thereof. Optionally in this embodiment or any other embodiment of the present disclosure, the fluid may further include a sulfur-containing species that may be selected from the group consisting of: hydrogen sulfide, a sulfide ion, a mercaptan, a polysulfide, and any combination thereof.

Another embodiment of the present disclosure is a method including introducing a sulfide scavenging additive including zinc ammonium carbonate into a fluid retention pit in which a potential sulfur-containing fluid is present and wherein the temperature of an environment in which the fluid is present may be in the range of from about −20° C. to about 0° C., wherein the sulfide scavenging additive may include a solution including zinc ammonium carbonate in an amount of from about 0.1% to about 26% by weight of the solution. Optionally in this embodiment or any other embodiment disclosed herein, the sulfide scavenging additive may further include one or more glycols. Optionally in this embodiment or any other embodiment of the present disclosure, the fluid may include at least one component selected from the group consisting of: water, salt water, brine, seawater, a gas, a liquid hydrocarbon, an oil-water mixed production fluid, and any combination thereof.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Figure 2:
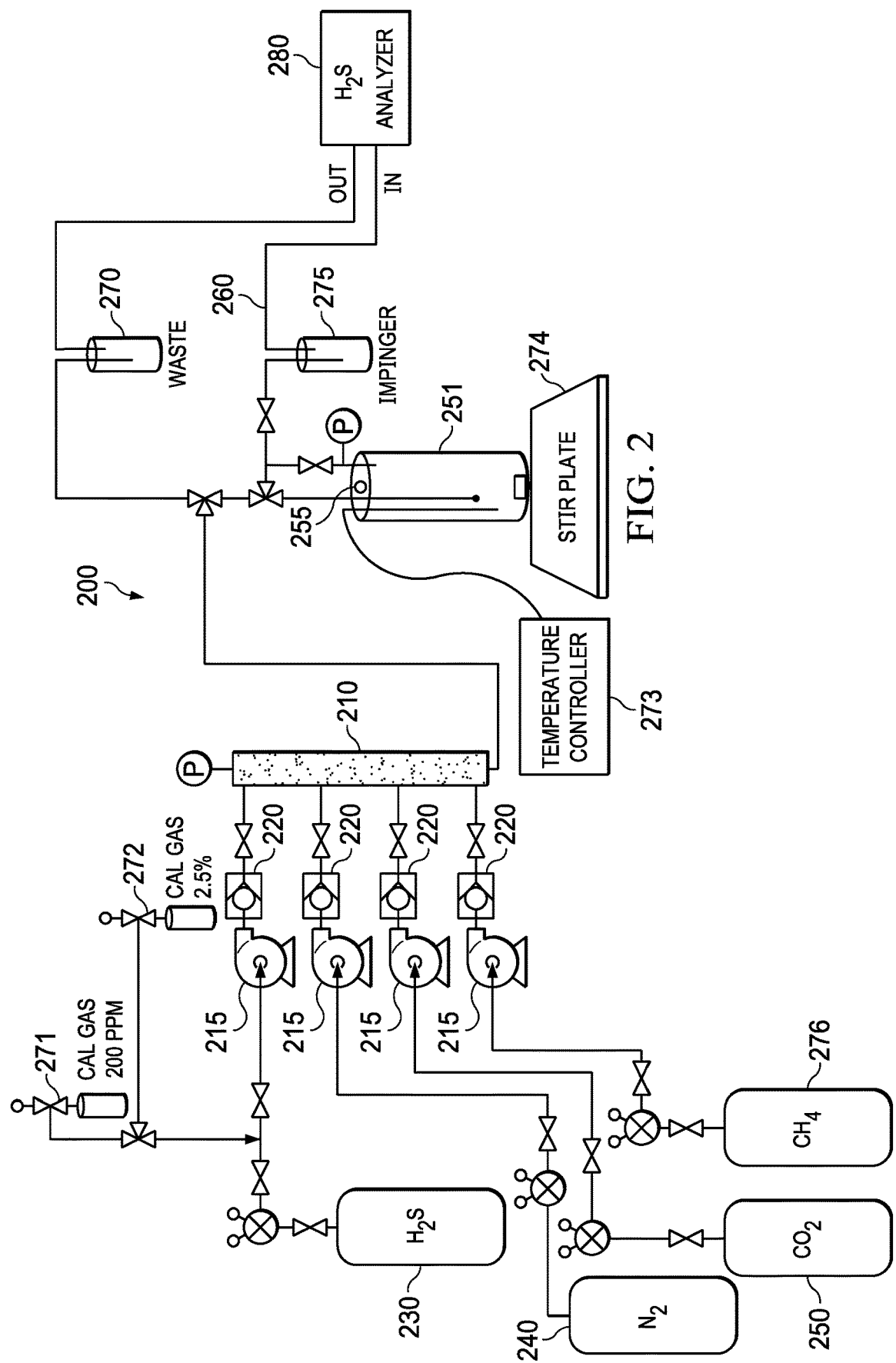
FIG. 2 is a schematic diagram of a test apparatus used to test the scavenging rate of one or more sulfide scavengers under differing test conditions, in accordance with certain embodiments of the present disclosure.

The following examples demonstrate laboratory tests conducted to evaluate the scavenging efficiency of the zinc ammonium carbonate sulfide scavenging additives according to some embodiments of the present disclosure in comparison to other sulfide scavengers. The zinc ammonium carbonate solution was tested using test apparatus 200 as shown in FIG. 2. Gas mixture 210 containing 300 ppm hydrogen sulfide 230 (with a balance of nitrogen 240) and anaerobic grade carbon dioxide 250 was bubbled at a total flow rate of 300 mL min$^{-1}$ through column 251 containing a mixture of 450 mL de-ionized (DI) water and 50 mL methanol, de-aerated by purging with nitrogen prior to the test. Test apparatus 200 includes flow controllers 215 and check valves 220. Test apparatus 200 may also include waste container 270, calibration gas at 200 ppm 271, calibration gas at 2.5% 272, temperature controller 273, stir plate 274, impinger 275, and methane 276. The molar ratio of hydrogen sulfide 230 to carbon dioxide 250 in gas mixture 210 was varied by adjusting the flow rates of the respective gas streams. The hydrogen sulfide concentration at outlet 260 of column 251 was recorded using hydrogen sulfide analyzer 280. Once a stable hydrogen sulfide concentration baseline was obtained at outlet 260, a set amount of sulfide scavenger was injected at position 255 at the top of column 251. The hydrogen sulfide concentration was monitored at outlet 260 of column 251 until a stable hydrogen sulfide concentration close to the baseline hydrogen sulfide concentration was observed. The test conditions were adjusted so as to have a very short contact time (approximately 4-5 seconds) between hydrogen sulfide 230 and the sulfide scavenger in column 251 in order to determine the speed of the scavenging reaction.

Example 1

Figure 3:
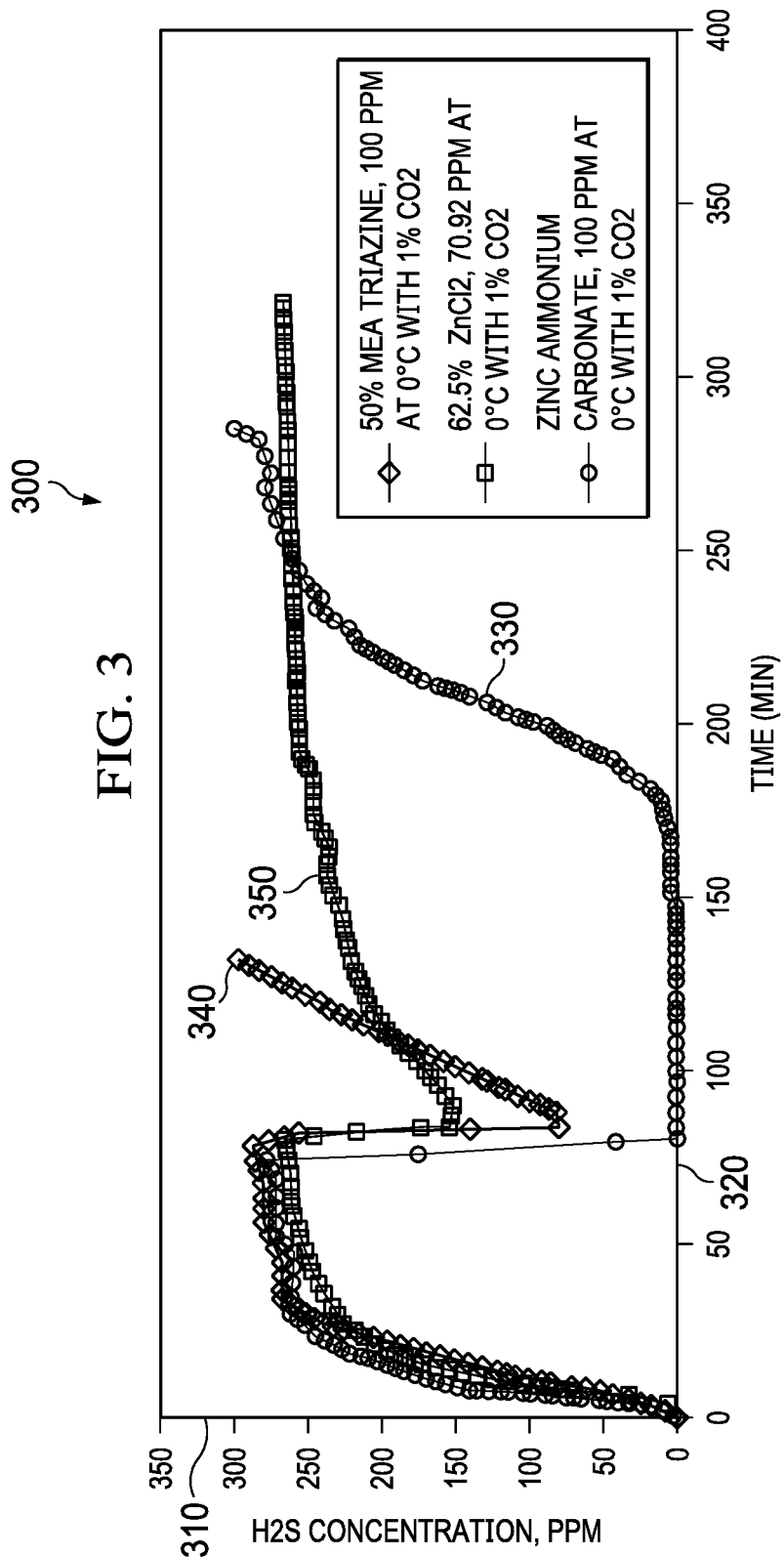
FIG. 3 is a plot comparing the scavenging rate of a sulfide scavenger of the present disclosure with that of other sulfide scavengers at 0° C., in accordance with certain embodiments of the present disclosure.

In this example, the hydrogen sulfide scavenging efficiency of a zinc ammonium carbonate sulfide scavenging additive in the form of a zinc ammonium carbonate solution at 100 ppm was compared to hydrogen sulfide scavengers hexahydro-1,3,5-tris(hydroxyethyl)-s-triazine (MEA-Triazine) solution at 100 ppm and zinc chloride ($ZnCl_2$) solution at 70.92 ppm. These tests were performed at 0° C. and 1% carbon dioxide by volume of the gas mixture. The results of these tests are shown in FIG. 3. Referring now to FIG. 3, plot 300 shows the hydrogen sulfide concentration on axis 310 against time on axis 320 for the three sulfide scavengers, MEA-Triazine 340, zinc chloride 350, and zinc ammonium carbonate 330. FIG. 3 shows that MEA-Triazine solution reduced hydrogen sulfide in the gas phase from about 270 ppm to about 80 ppm, zinc chloride solution reduced hydrogen sulfide in the gas phase from about 270 ppm to about 150 ppm, and the zinc ammonium carbonate solution of the present disclosure reduced hydrogen sulfide in the gas phase from about 270 ppm to about 0 ppm. Additionally, the hydrogen sulfide concentration remained low much longer for the zinc ammonium carbonate solution compared to the other scavengers. These results demonstrate that zinc ammonium carbonate solution is able to scavenge hydrogen sulfide much more effectively and completely than MEA-Triazine solution and zinc chloride solution under these conditions. The gradual increase in hydrogen sulfide concentration after the reduction in concentration is due to the continual flow of hydrogen sulfide concentration into the test apparatus.

Example 2

Figure 4:
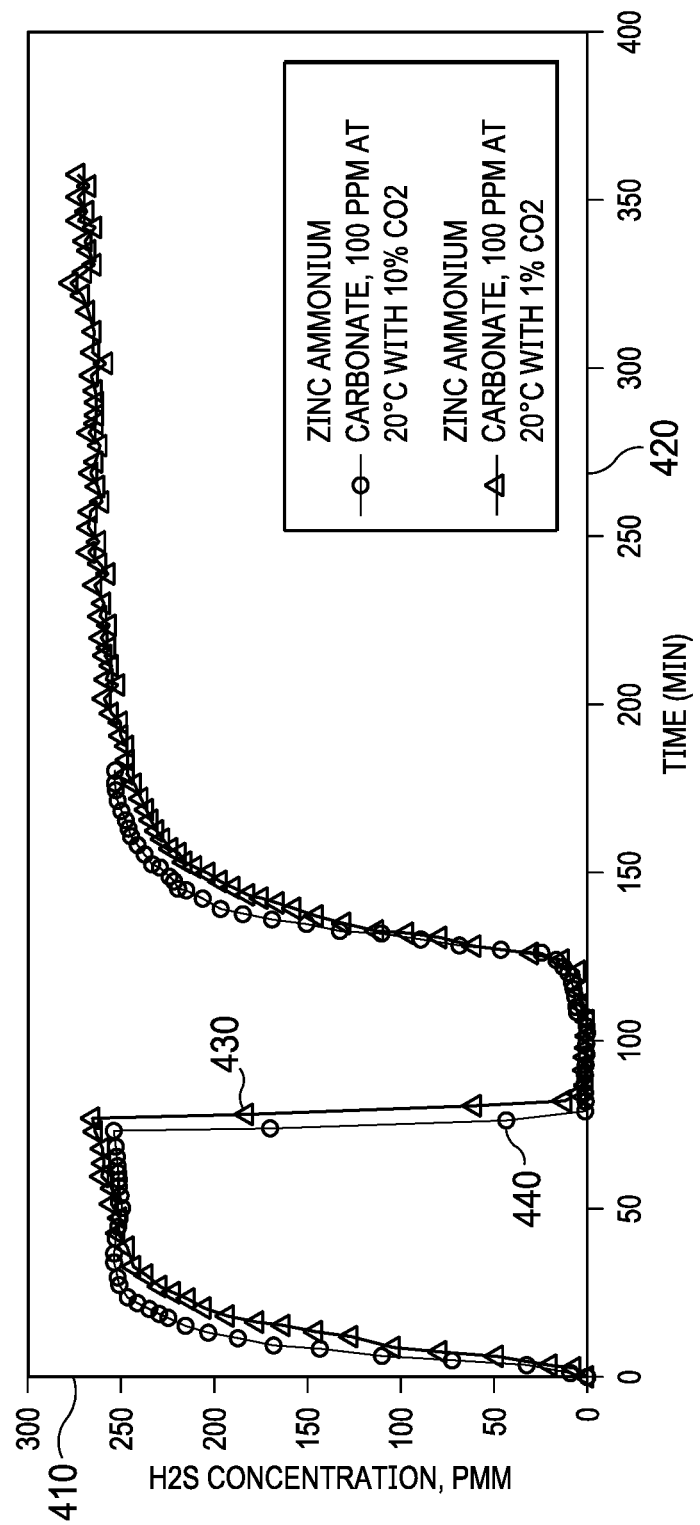
FIG. 4 is a plot comparing the scavenging rates of a sulfide scavenger of the present disclosure at different concentrations of carbon dioxide in accordance with certain embodiments of the present disclosure.

In this example, the hydrogen sulfide scavenging efficiency of a zinc ammonium carbonate solution at 100 ppm was compared at different concentrations of carbon dioxide. These tests were performed at 20° C. and at 1% and 10% carbon dioxide by volume of the gas mixture. The results of these tests are shown in FIG. 4. Referring now to FIG. 4, plot 400 shows the hydrogen sulfide concentration on axis 410 against time on axis 420 for zinc ammonium carbonate solution at 1% carbon dioxide 430 and zinc ammonium carbonate solution at 10% carbon dioxide 440. FIG. 4 shows that the zinc ammonium carbonate solution of the present disclosure reduced hydrogen sulfide in the gas phase from about 270 ppm to about 0 ppm at both 1% and 10% carbon dioxide by volume of the gas mixture. These results demonstrate that increasing the carbon dioxide concentration in the inlet stream has a negligible impact on the scavenging reaction rate for the zinc ammonium carbonate solution under these conditions. The gradual increase in hydrogen sulfide concentration after the reduction in concentration is due to the continual flow of hydrogen sulfide concentration into the test apparatus.

Example 3

Figure 5:
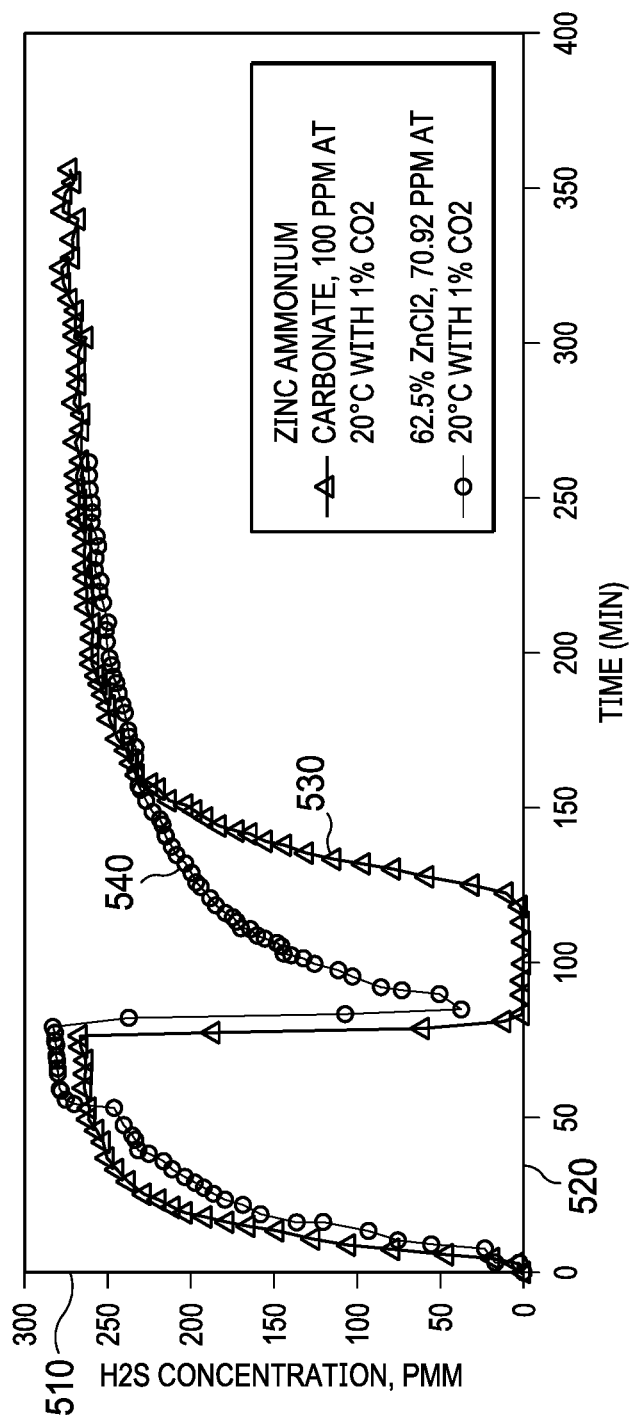
FIG. 5 is a plot comparing the scavenging rate of a sulfide scavenger of the present disclosure with that of other sulfide scavengers at 20° C., in accordance with certain embodiments of the present disclosure.

In this example, the hydrogen sulfide scavenging efficiency of a zinc ammonium carbonate solution at 100 ppm was compared to a zinc chloride ($ZnCl_2$) solution at 70.92 ppm under experimental conditions of 20° C. and 1% carbon dioxide by volume of the gas mixture. The results of these tests are shown in FIG. 5. Referring now to FIG. 5, plot 500 shows hydrogen sulfide concentration on axis 510 against time on axis 520 for the sulfide scavengers zinc ammonium carbonate 530 and zinc chloride 540. FIG. 5 shows that zinc ammonium carbonate solution reduced hydrogen sulfide in the gas phase from about 270 ppm to about 0 ppm, and zinc chloride solution reduced hydrogen sulfide in the gas phase from about 270 ppm to about 40 ppm. Additionally, the hydrogen sulfide concentration remained low much longer for the zinc ammonium carbonate solution than the zinc chloride solution. These results demonstrate that, at 20° C., the zinc ammonium carbonate solution is able to scavenge hydrogen sulfide much more effectively and completely than the zinc chloride solution under these conditions. Combined with the results described in Example 1 performed at 0° C. and 1% carbon dioxide by volume of the gas mixture, these results demonstrate that the zinc ammonium carbonate solution of the present disclosure is able to scavenge hydrogen sulfide more efficiently than the other tested hydrogen sulfide scavengers over a range of temperatures. The gradual increase in hydrogen sulfide concentration after the reduction in concentration is due to the continual flow of hydrogen sulfide concentration into the test apparatus.

Example 4

In this example, the mercaptan scavenging efficiency of a zinc ammonium carbonate solution at 4 ppm in an aqueous solution was measured. In this test, de-aerated de-ionized water was saturated with 10 ppm methyl mercaptan in a sample bottle. The mercaptan concentration in the headspace of a sample bottle was measured using a Sensidyne gas detector tube. The aqueous 4 ppm zinc ammonium carbonate solution was added to the methyl mercaptan saturated aqueous phase solution, and the mixture was stirred for 15 minutes. After 15 minutes of stirring, the methyl mercaptan level had dropped to 2 ppm. An additional 4 ppm of the zinc ammonium carbonate solution was then injected followed by stirring for a further 10 minutes. The methyl mercaptan level was measured again and was found to have dropped to 0 ppm. These results demonstrate that the zinc ammonium carbonate solution of present disclosure may be used to scavenge mercaptans from an aqueous solution.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   introducing a sulfide scavenging additive comprising zinc ammonium carbonate and one or more glycols into at least a portion of a conduit through which a potential sulfur-containing fluid is flowing.

2. The method of claim 1, wherein the sulfide scavenging additive comprises a solution comprising zinc ammonium carbonate in an amount of from about 0.1% to about 26% by weight of the solution.

3. The method of claim 1, wherein the sulfide scavenging additive is in contact with the fluid for a contact time of from about 0.1 seconds to about 20 seconds.

4. The method of claim 1, wherein a temperature of an environment in which the fluid is flowing is in the range of from about −20° C. to about 0° C.

5. The method of claim 1, wherein the fluid comprises a gas phase and the gas phase comprises carbon dioxide in an amount of from about 0.01% to about 20% by volume of gas.

6. The method of claim 1, wherein the fluid comprises at least one component selected from the group consisting of: water, salt water, brine, seawater, a gas, a liquid hydrocarbon, an oil-water mixed production fluid, and any combination thereof.

7. The method of claim 1, wherein the fluid further comprises a sulfur-containing species that is selected from the group consisting of: hydrogen sulfide, a sulfide ion, a mercaptan, a polysulfide, and any combination thereof.

8. A method comprising:
   introducing a sulfide scavenging additive comprising zinc ammonium carbonate and one or more glycols into a container in which a potential sulfur-containing fluid is present.

9. The method of claim 8, wherein the sulfide scavenging additive comprises a solution comprising zinc ammonium carbonate in an amount of from about 0.1% to about 26% by weight of the solution.

10. The method of claim 8, wherein the sulfide scavenging additive is in contact with the fluid for a contact time of from about 0.1 seconds to about 20 seconds.

11. The method of claim 8, wherein a temperature of an environment in which the fluid is present is in the range of from about −20° C. to about 0° C.

12. The method of claim 8, wherein the fluid comprises a gas phase and the gas phase comprises carbon dioxide in an amount of from about 0.01% to about 20% by volume of gas.

13. The method of claim 8, wherein the fluid comprises at least one component selected from the group consisting of: water, salt water, brine, seawater, a gas, a liquid hydrocarbon, an oil-water mixed production fluid, and any combination thereof.

14. The method of claim 8, wherein the fluid further comprises a sulfur-containing species that is selected from the group consisting of: hydrogen sulfide, a sulfide ion, a mercaptan, a polysulfide, and any combination thereof.

15. A method comprising:
   introducing a sulfide scavenging additive comprising zinc ammonium carbonate and one or more glycols into a fluid retention pit in which a potential sulfur-containing fluid is present and wherein a temperature of an environment in which the fluid is present is in the range of from about −20° C. to about 0° C.

16. The method of claim 15, wherein the sulfide scavenging additive comprises a solution comprising zinc ammonium carbonate in an amount of from about 0.1% to about 26% by weight of the solution.

17. The method of claim 15, wherein the fluid comprises at least one component selected from the group consisting of: water, salt water, brine, seawater, a gas, a liquid hydrocarbon, an oil-water mixed production fluid, and any combination thereof.

* * * * *